United States Patent
Yang et al.

(10) Patent No.: US 10,626,308 B2
(45) Date of Patent: Apr. 21, 2020

(54) ADHESIVE COMPOSITION AND AN ARTICLE MANUFACTURED THEREFROM

(71) Applicant: 3M INNOVATIVE PROPERTIES COMPANY, St. Paul, MN (US)

(72) Inventors: Zhenqian Yang, Shanghai (CN); Liang Qin, Shanghai (CN); Dong Li, Shanghai (CN); Ping Zhou, Shanghai (CN); Xiongjian Wu, Shanghai (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 140 days.

(21) Appl. No.: 15/752,802

(22) PCT Filed: Sep. 15, 2015

(86) PCT No.: PCT/CN2015/089603
§ 371 (c)(1),
(2) Date: Feb. 14, 2018

(87) PCT Pub. No.: WO2017/045119
PCT Pub. Date: Mar. 23, 2017

(65) Prior Publication Data
US 2018/0244964 A1    Aug. 30, 2018

(51) Int. Cl.
C09J 167/02      (2006.01)
C09J 163/00      (2006.01)
C08L 63/00       (2006.01)
C08L 67/02       (2006.01)
C09J 7/30        (2018.01)

(52) U.S. Cl.
CPC .............. *C09J 167/02* (2013.01); *C08L 63/00* (2013.01); *C08L 67/02* (2013.01); *C09J 7/30* (2018.01); *C09J 163/00* (2013.01); *C09J 2463/00* (2013.01); *C09J 2467/00* (2013.01)

(58) Field of Classification Search
CPC ...................................................... C09J 167/02
See application file for complete search history.

(56) References Cited

U.S. PATENT DOCUMENTS

| | | | |
|---|---|---|---|
| 4,739,019 A | 4/1988 | Schappert et al. | |
| 5,162,140 A | 11/1992 | Taniguchi | |
| 6,228,500 B1 | 5/2001 | Hiroshige et al. | |
| 7,615,595 B2 | 11/2009 | Lutz et al. | |
| 10,392,540 B2 * | 8/2019 | Qin | C08L 67/02 |
| 2002/0182955 A1 | 12/2002 | Weglewski | |
| 2012/0046389 A1 * | 2/2012 | Garcia | C08G 59/226 523/400 |
| 2013/0137796 A1 | 5/2013 | Kropp | |
| 2015/0031817 A1 | 1/2015 | Takayanagi et al. | |
| 2015/0079402 A1 * | 3/2015 | Tang | C08L 63/00 428/418 |

FOREIGN PATENT DOCUMENTS

| | | |
|---|---|---|
| CN | 101851480 | 10/2010 |
| CN | 101040025 | 6/2011 |
| CN | 101418205 | 5/2012 |
| CN | 102079956 | 6/2012 |
| CN | 102010569 | 7/2012 |
| CN | 102226033 | 10/2012 |
| CN | 101747587 | 11/2012 |
| CN | 102190865 | 12/2012 |
| CN | 104293104 | 1/2015 |
| JP | 2004-285307 A | 10/2004 |
| WO | WO 2012/021258 | 2/2012 |

OTHER PUBLICATIONS

International Search Report for PCT International Application No. PCT/CN2015/089603, dated Jun. 16, 2016, 3pgs.
Supplemental EP Search Report for EP Appl. No. 15903810, dated Apr. 2, 2019, 2 pp.

* cited by examiner

*Primary Examiner* — Megan McCulley
(74) *Attorney, Agent, or Firm* — Janet A. Kling

(57) ABSTRACT

The present disclosure relates to a B-stageable adhesive composition and an article prepared by the same. In the present disclosure, the adhesive composition comprises the following components in solid content percentage: (A) 10% to 50% by weight of a first epoxy resin with a weight average molecular weight Mw of 8,000 g/mol or more; (B) 5% to 20% by weight of a second epoxy resin with a weight average molecular weight Mw of 200 to 6,000 g/mol; (C) 30% to 80% by weight of a hydroxyl terminated polyester or derivates thereof; (D) 0.1% to 2.5% by weight of a first curing agent capable of reacting with epoxy group; and (E) 0.1% to 2.5% by weight of a second curing agent capable of reacting with hydroxyl group; the sum of components of the composition is equal to 100% by weight. The coating obtained from the adhesive composition of the present disclosure shows high adhesive strength, excellent heat resistance and flame retardance.

19 Claims, No Drawings

ADHESIVE COMPOSITION AND AN ARTICLE MANUFACTURED THEREFROM

TECHNICAL FIELD

The present disclosure relates to an epoxy adhesive composition and an article manufactured from the adhesive composition. More specifically, the present disclosure relates to a B-stageable epoxy adhesive composition and a B-stageable article manufactured therefrom which has high adhesion strength, heat resistance and improved toughness.

BACKGROUND ART

Along with the development of new markets and industrial trend, the electrical devices and equipment become smaller, thinner, lighter and having high power density. High temperature rating insulation material becomes more and more important for the application of insulation protection in electrical market. The insulation tape with rubber based PSA or acrylic PSA is one key type of the insulation material for electrical device and equipment. Generally, the temperature rating of such materials are class B or below, and the thermal degradation of these materials at high temperature would result in a loss of adhesion and other performances.

CN102079956 (A) discloses a white covering film and a manufacturing method thereof. The white covering film comprises a release basement membrane, a white coating coated on the release basement membrane and an adhesive layer coated on the white coating. The white coating is obtained from a composition which uses flexible saturated polyester as a matrix and comprises flexible saturated polyester, hard saturated polyester, blocked isocyanate curing agent, pigment, inorganic filler, fluorescent brightening agent, antifoaming agent and a suitable amount of solvent.

CN102010569 (A) discloses a halogen-free flame retardant epoxy resin composition and a high flexible coating film prepared by the same. The halogen-free flame retardant epoxy resin composition comprises flexible epoxy resin, special epoxy resin, synthetic rubber, rubber modified epoxy resin, an aromatic amine curing agent, an imidazole curing accelerator, an antioxidant, a phosphorus-containing flame retardant, a filler, and an organic solvent. The high flexible coating film prepared by the composition comprises a polyimide insulating film, a halogen-free flame retardant epoxy resin composition coating coated on the polyimide insulating film, and a piece of release paper coated on the halogen-free flame retardant epoxy resin composition coating.

SUMMARY OF THE INVENTION

In the present disclosure, a B-stageable epoxy adhesive composition is developed to provide a better solution for bonding and insulation in the field of requiring good adhesion strength, toughness, shelf life and aging performance, and functional properties such as heat resistance and flame retardance.

In an aspect, the present disclosure provides an adhesive composition, based on the total weight of the composition, comprising the following components in solid content percentage:

(A) 10% to 50% by weight of a first epoxy resin with a weight average molecular weight Mw of 8,000 g/mol or more;

(B) 5% to 20% by weight of a second epoxy resin with a weight average molecular weight Mw of 200 to 6,000 g/mol;

(C) 30% to 80% by weight of a hydroxyl terminated polyester or derivates thereof;

(D) 0.1% to 2.5% by weight of a first curing agent capable of reacting with epoxy group; and (E) 0.1% to 2.5% by weight of a second curing agent capable of reacting with hydroxyl group.

the sum of components of the composition is equal to 100% by weight.

The adhesive composition according to the present invention may further comprise additives such as flame retardant, conductive particle, thermal conductive filler, pigment and so on.

According to another aspect of the present disclosure, a coating formed by the adhesive composition is provided.

According to another aspect of the present disclosure, an article comprising a substrate and a coating is provided.

According to another aspect of the present disclosure, a method for preparing the coating is provided, and the method comprises the step of mixing all the components of the adhesive composition according to the present disclosure.

According to another aspect of the present disclosure, a method for preparing the article is provided, and the method comprises the step of applying the coating according to the present disclosure onto a surface of a substrate.

The coating prepared by the adhesive composition according to the present disclosure having required adhesion strength, toughness, shelf life and aging performance, and functional properties such as heat resistance and flame retardance.

DETAILED DESCRIPTION OF THE INVENTION

It shall be understood that one skilled in the art can contemplate other various embodiments and make modifications thereto according to the teachings of the description without departing from the scope or spirit of the present disclosure. Therefore, the following embodiments are not intended to be limiting in any sense.

Unless otherwise specified, it shall be understood that all numbers which are used in the description and claims to represent feature sizes, quantities and physicochemical characteristics are modified by the term "approximate" in all cases. Therefore, unless otherwise oppositely stated, numerical parameters which are listed in the description and claims attached thereto are approximate values. One skilled in the art can properly change these approximate values according to the teachings disclosed herein so as to obtain desired characteristics. Numerical ranges which are expressed by using end points shall include all numbers and any range therein. For instance, the range 1-5 includes 1, 1.1, 1.3, 1.5, 2, 1.75, 3, 3.80, 4, and 5, etc.

Unless otherwise specified, it shall be understood that, the expression "in solid content percentage" refers to the percentage of a component in the composition in solid content basis, i.e. the solvent contained in the adhesive composition is excluded. Moreover, all percentages used herein refer to weight percentages which are based on the total weight of the adhesive composition.

Unless otherwise specified, it shall be understood that the expression "B-stageable" refers to the adhesive and the composite with two steps curing reaction, the first step complete in the oven on line or by post cure, the second step complete in the heat lamination process.

Adhesive Composition

According to an aspect of the present disclosure, an adhesive composition is provided, based on the total weight of the composition, which comprises the following components in solid content percentage:

(A) 10% to 50% by weight of a first epoxy resin with a weight average molecular weight Mw of 8,000 g/mol or more;

(B) 5% to 20% by weight of a second epoxy resin with a weight average molecular weight Mw of 200 to 6,000 g/mol;

(C) 30% to 80% by weight of a hydroxyl terminated polyester or derivates thereof;

(D) 0.1% to 2.5% by weight of a first curing agent capable of reacting with epoxy group; and (E) 0.1% to 2.5% by weight of a second curing agent capable of reacting with hydroxyl group.

the sum of components of the composition is equal to 100% by weight.

The adhesive composition according to the present invention may further comprise additives in an amount of up to 50% by weight of the composition, such as flame retardant, conductive particle, thermal conductive filler, and pigment and so on.

The components as used in the present disclosure will be described in detail below.

(A) The First Epoxy Resin

The first epoxy resin with a high molecular weight is contained in the adhesive composition to provide a coating obtained from the adhesive composition with good adhesion strength and heat resistance. In addition, the first epoxy resin imparts the coating with essential mechanical strength and rigidity.

In an aspect, the first epoxy resin used in the present disclosure has a weight average molecular weight Mw of 8,000 g/mol or more, advantageously 10,000 g/mol or more, advantageously 12,000 g/mol or more, advantageously 15,000 g/mol or more, advantageously 20,000 g/mol or more, and advantageously 25,000 g/mol or more.

In another aspect, the first epoxy resin used in the present disclosure may have an epoxide equivalent weight of about 4,000 g/eq or more, advantageously about 5,000 g/eq or more, advantageously about 6,000 g/eq or more, advantageously about 7,500 g/eq or more, and advantageously about 10,000 g/eq or more.

According to certain embodiments, the first epoxy resin can be selected from the group consisting of bisphenol A-type epoxy resins, brominated bisphenol A-type epoxy resins, bisphenol F-type epoxy resins, bisphenol AD-type epoxy resins, novolac epoxy resin, trisphenolmethane epoxy resin, glycidylamine epoxy resin, aminophenol epoxy resin, naphthalene epoxy resin, epoxy resins containing a fluorene ring, cycloaliphatic glycidyl ether-type epoxy resins, cycloaliphatic glycidylamine-type epoxy resins, and cycloaliphatic glycidyl ester-type epoxy resins. Preferably, the first epoxy resin can be selected from the group consisting of bisphenol A-type epoxy resins, brominated bisphenol A-type epoxy resins, bisphenol F-type epoxy resins, bisphenol AD-type epoxy resins, novolac epoxy resin and the combination thereof. For example, a bisphenol A-type epoxy resin is formed from reacting two moles of epichlorohydrin with one mole of bisphenol A to form the bisphenol A diglycidyl ether.

The use of these epoxy resins allows a uniform three-dimensional network structure to be formed after being cured, and also allows heat resistance and adhesion strength to be imparted to the coating obtained from the adhesive composition after be cured.

With respect to the amount of the first epoxy resin in the adhesive composition, based on the total weight of the composition, the solid content of the first epoxy resin is in a range of 10-50% by weight, advantageously 15-45% by weight, advantageously 25-40% by weight, advantageously 25-35% by weight, and advantageously 30-35% by weight. In the case that the first epoxy resin was used in the above amount range and in combination with the second epoxy resin together with the toughener, a good balance of adhesion strength and heat resistance will be achieved for the adhesive composition.

(B) The Second Epoxy Resin

The second epoxy resin with a lower molecular weight is contained in the adhesive composition to provide the cross-linking capability and adhesion of the coating obtained from the adhesive composition after being cured.

According to certain embodiments, the second epoxy resin can be selected from the group consisting of an epoxy oligomer or an epoxy polymer with a weight average molecular weight Mw of about 200 to 6,000 g/mol, advantageously 400 to 5,000 g/mol, advantageously 800 to 4,000 g/mol, and advantageously 1,000 to 3,000 g/mol.

According to certain embodiments, the second epoxy resin with a glass transition temperature Tg of 150° C. or less is preferably used in the present adhesive composition. If the glass transition temperature Tg of the second epoxy resin is 150° C. or less, it might provide an additional advantage of good balance on adhesion and heat resistance.

According to certain embodiments, the second epoxy resin has an epoxide equivalent weight of 100 to 3500 g/eq, advantageously 100 to 3000 g/eq, and advantageously 150 to 2500 g/eq. When the second epoxy resin having the above epoxide equivalent weight, the coating obtained from the adhesive composition will form an interpenetrating polymer network (IPN), which provides good adhesion strength, and good preliminary toughness.

According to certain embodiments, the second epoxy resin can be selected from modified or unmodified epoxy resins. For example, polyurethane (PU) modified epoxy resin including polyurethane modified bisphenol A epoxy resins, polyurethane modified bisphenol F epoxy resin, polyurethane modified novolak epoxy resins, polyurethane modified trisphenolmethane epoxy resin, polyurethane modified glycidylamine epoxy resins, polyurethane modified aminophenol epoxy resins, polyurethane modified naphthalene epoxy resins are preferably used in the present adhesive composition.

According to certain embodiments, based on the total weight of the adhesive composition, the solid content of the second epoxy resin is in a range of 5 to 20% by weight, advantageously 8 to 20% by weight, advantageously 9 to 16% by weight, and advantageously 10 to 15% by weight.

The combination of component (A) and (B) is also called as a two-component epoxy resin system according to the present disclosure. According to certain embodiments, the present adhesive composition preferably comprises the combination of a bisphenol A epoxy resin with a high molecular weight and a modified or unmodified bisphenol A epoxy resin with a low molecular weight as a combination of component (A) and (B). According to certain embodiments, the weight ratio of the first epoxy resin to the second epoxy resin is in a range of 10:1 to 1:2, preferably 5:1 to 1:1, preferably 4:1 to 1.5:1, more preferably 3:1 to 1.5:1, in a solid content basis. If weight ratio of the first epoxy resin to the second epoxy resin is in the above range, it might provide an additional advantage of good balance on the adhesion strength and heat resistance.

(C) The Toughener Polyester

In the present disclosure, a hydroxyl terminated polyester is contained in the adhesive composition as a toughener to further improve the toughness of a coating obtained from the epoxy adhesive composition of the present disclosure after being cured. The hydroxyl terminated polyester has functional groups which under the conditions of the curing reaction especially under high temperature and pressure, can react with the epoxy resin so as to improve the toughness of the coating formed by curing.

According to certain embodiments, the hydroxyl terminated polyester or derivates thereof according to the present disclosure is also capable to react with the active curing agent in the epoxy adhesive composition so as to prevent or avoid the reaction between the epoxy resins and the active curing agent during storage of the adhesive composition and storage of the B-stage cured articles. Therefore, the shelf life of the adhesive composition or the B-stageable articles can be well protected. For example, the B-stageable articles such as an adhesive tape can be stored for more than one year under room temperature without losing the high adhesion strength and high heat resistance thereof.

According to certain embodiments, the hydroxyl terminated polyester has a weight average molecular weight Mw of 8,000 g/mol or more, advantageously 10,000 g/mol or more, and advantageously 15,000 g/mol or more. In case the weight average molecular weight of the hydroxyl terminated polyester is in the above range, a balance of adhesion strength and heat resistance will be achieved for the adhesive composition.

According to certain embodiments, the hydroxyl terminated polyester with a glass transition temperature Tg of 30° C. or less is preferably used in the present adhesive composition.

According to certain embodiments, the hydroxyl terminated polyester preferably has a hydroxyl value of 3-100 mg KOH/g, preferably 10-80 mg KOH/g, more preferably 10-60 mg KOH/g, and more preferably 20-50 mg KOH/g. If the hydroxyl terminated polyester has above hydroxyl value, it might provide an advantage of good balance on the curing capability and modules of the adhesive.

According to certain embodiments, the hydroxyl terminated polyester comprises a dicarboxylic acid unit and a glycol unit. According to certain embodiments, the dicarboxylic acid unit can be selected from the group consisting of: succinic acid, adipic acid, cyclohexane diacid, suberic acid, phthalic acid, naphthalene acid, trimellitic acid, and pyromellitic acid. According to certain embodiments, the glycol unit can be selected from the group consisting of: ethylene glycol, propylene glycol, butanediol, pentanediol, hexanediol, octanediol, decanediol, diethylene glycol, dipropylene glycol, dimethylolpropane, and dimethylolethane. According to certain embodiments, the hydroxyl terminated polyester comprises an aromatic segment either in the dicarboxylic acid unit or in the glycol unit.

According to certain embodiments, the hydroxyl terminated polyester can be selected from the group consisting of: hydroxyl terminated phthalate polyester and hydroxyl terminated diethyl sebacate polyester.

With respect to the amount of the hydroxyl terminated polyester in the adhesive composition, based on the total weight of the composition, the solid content of polyester is in a range of 30 to 80% by weight, advantageously 40 to 70% by weight, advantageously 40 to 60% by weight, advantageously 50 to 60% by weight.

Preferably the weight ratio of the hydroxyl terminated polyester to the sum of the first and second epoxy resin is in a range of 0.3:1 to 5:1, preferably 0.5:1 to 3:1, preferably 0.6:1 to 2.5:1, preferably 0.7:1 to 2:1, preferably 0.8:1 to 1.5:1, preferably 1:1 to 1.5:1, in a solid content basis.

(D) The First Curing Agent and (E) Second Curing Agent

In the present disclosure, a curing agent system is contained in the adhesive composition. And upon heat activation, epoxy groups of the epoxy resin will react with the curing agents thereby crosslinking the epoxy resin to obtain a cured coating.

The curing agent system comprises a first curing agent (D) and a second curing agent (E) according to the present disclosure, in which the first curing agent (D) is a latent curing agent which provides effective curing at elevated temperature and/or pressure, and the second curing agent (E) is an active curing agent which provides good adhesive cohesion and heat resistance upon curing at a relative lower temperature.

Preferably, the second curing agent (E) which is an active curing agent has the capability of reacting with the hydroxyl terminated polyester. By choosing the second curing agent and controlling the amount thereof, the adhesive composition according to the present disclosure and the coating obtained from the composition can be imparted with additional effects on the prolonged shelf time without losing the adhesive strength and heat resistance.

According to certain embodiments, the first curing agent (D) can be selected from the group consisting of dicyandiamide, dihydrazide, amine-based curing agent, acid anhydride-based curing agent, imidazole compound, borofluoride, octoate salt, their encapsulate, and the combination thereof. Preferably the first curing agent (D) can be selected from the group consisting of amine-based curing agent and an acid anhydride-based curing agent. As an amine-based curing agent, for example, aromatic amines such as diaminodiphenylmethane or diaminodiphenyl sulfone, aliphatic amines, imidazole derivatives, dicyandiamide, tetramethylguanidine, and/or thiourea-added amine may be used in the present adhesive system.

The first curing agent (D) has the functional group which is capable of reacting with epoxy group of the epoxy resin, preferably at elevated temperature e.g., above 120° C. The period of curing reaction is generally several minutes to several hours according to the specific curing agent. The first curing agent (D) may be commercial available and a skilled person will understand the condition of the curing reaction according to the instruction of the curing agent.

According to certain embodiments, the second curing agent (E) can be selected from the group consisting of carboxylic compound, amine based polymer, isocyanate, isocyanate prepolymer, diisocyanate and diisocyanate prepolymer or their mixture. Preferably, according to certain embodiments, the second curing agent can be selected from isocyanate, isocyanate prepolymer, diisocyanate and diisocyanate prepolymer or their mixture, such as tolylene diisocyanate, diphenyl methane diisocyanate, hexamethylene diisocyanate, isophorone diisocyanate and their prepolymer.

With respect to the amount of curing agent in the adhesive composition, based on the total weight of the adhesive composition, the sum of the first curing agent and the second curing agent is in a range of 0.1%-5% by weight, advantageously 0.4%-3% by weight, advantageously 0.4%-2% by weight, and advantageously 0.5%-1.0% by weight. Herein, the content of the first curing agent in the adhesive composition is in a range of 0.1%-2.5% by weight, advantageously 0.2%-1.5% by weight, advantageously 0.5%-1.2% by weight, and advantageously 0.8%-1.2% by weight; and the content of the second curing agent in the adhesive composition is in a range of 0.1%-2.5% by weight, advantageously 0.2%-1.5% by weight, advantageously 0.5%-1.2% by weight, and advantageously 0.8%-1.2% by weight. When the first curing agent and the second curing agent are contained in the adhesive composition in the amount of the above range, the coating obtained from the adhesive composition will have an effective curing capability at elevated temperature, a long shelf life and in the meanwhile good adhesion strength and heat resistance.

Additionally, the adhesive composition may optionally comprise a curing catalyst, for example, comprise 0 to 1% by weight of a curing catalyst such as urea, imidizole, quaternary ammonium salt, quaternary ammonium polymer and the mixture thereof.

(F) Additives

In the present disclosure, a flame retardant may be optionally contained in the adhesive composition so as to endow the articles obtained from the adhesive composition with excellent flame retardance. Preferably the flame retardant is a halogen-free flame retardant taking consideration of the environmental issue. The flame retardant which can be used in the present disclosure is selected from organic flame retardant and inorganic flame retardant, such as aluminum hydroxide, magnesium hydroxide, MgO, ZnO, organophosphorus salt, phosphate, phosphorus containing polymer or nitrogen containing polymer or their hybrid.

Among the above, phosphate in particular triphenyl phosphate has excellent flame retardance and self-extinguishing properties resulting from phosphorus atoms contained therein and are therefore widely used as flame retardants for various resins.

In the present disclosure, the present inventor found that the flame retardant (for example, the combination of triphenyl phosphate and aluminum hydroxide) realizes efficient flame retardance effect, without impairing the other desired properties e.g. adhesion strength and heat resistance, even if the content of the flame retardant accounts for more than 20% of the total weight of the composition. Therefore, the flame retardant may be added into the present adhesive composition in a big bulk, for example, up to 40% by weight, based on the total weight of the composition.

In an aspect, for the purpose of providing effective flame retardance without impairing the desired properties of the adhesive composition, the content of the flame retardant in the adhesive composition is in a range of 5%-40% by weight, advantageously 10%-35% by weight, advantageously 20%-35% by weight, and advantageously 20%-30% by weight.

In addition to the above components, the adhesive composition of the present disclosure may comprise one or more of the following components, such as fillers, solvents, antioxidants, antifoaming agents, pigments, and surfactant.

When necessary, the fillers can be contained in the adhesive composition to modify or improve the properties of the adhesive composition, in which the fillers can be selected from conductive filler such as carbon black, Nickel powder, Copper powder, golden power, silver powder; thermal conductive filler such as boron nitride (BN), aluminum hydride (ATH); or other fillers such as $CaCO_3$, $SiO_2$, clay, chalk, glass fibers and so on.

According to certain embodiments, the solvent can be further contained in the adhesive composition to dissolve the related components e.g. epoxy resin, toughener, the curing agent and other additives, and help to disperse the flame retardant and fillers. According to certain embodiments, the solvent can be selected from the group consisting of N,N-Dimethyl formamide, methyl ethyl ketone, aliphatic solvent such as hexane, heptane and cyclohexane; aromatic solvent such as toluene and xylene.

According to certain embodiments, an antioxidant can be further contained in the adhesive composition to provide an advantage of better aging performance. According to certain embodiments, the antioxidant can be selected from the group consisting of tea polyphenols, Vitamin E, flavonoid, Butylated hydroxyanisole, Butylated hydroxytoluene, tert-Butyl hydroquinone. According to certain embodiments, based on the total weight of the adhesive composition, the solid content of the antioxidant is 0.1-5%, preferably 0.5-3%.

According to certain embodiments, an antifoaming agent can be further contained in the adhesive composition to provide an advantage of good coating surface. According to certain embodiments, the antifoaming agent can be selected from the group consisting of insoluble oils, polydimethylsiloxanes and other silicones, certain alcohols, stearates and glycols. According to certain embodiments, based on the total weight of the adhesive composition, the solid content of the antifoaming agent is 0.01~1%, preferably 0.1~0.5%.

According to certain embodiments, a pigment can be further contained in the adhesive composition to provide an advantage of color of the coating. According to certain embodiments, the pigment can be selected from the group consisting of carbon black, ivory black, Cadmium pigments, Chromium, Cobalt pigments, Copper, Iron oxide, Lead pigments, Manganese pigments, Mercury pigments, Titanium pigments, Zinc pigments. According to certain embodiments, based on the total weight of the adhesive composition, the solid content of the pigment is 0.1~20%, preferably 3~10%.

According to certain embodiments, a surfactant can be further contained in the adhesive composition to provide an advantage of good surface of the coating. According to certain embodiments, the surfactant can be selected from the group consisting of sulfate, sulfonate, phosphate, ammonium lauryl sulfate, sodium lauryl sulfate (SDS, sodium dodecyl sulfate) and the related alkyl-ether sulfates sodium laureth sulfate, also known as sodium lauryl ether sulfate (SLES), and sodium myreth sulfate. According to certain embodiments, based on the total weight of the adhesive composition, the solid content of the surfactant is 0.01~5%, preferably 0.1~3%.

In the present disclosure, the above mentioned components may be mixed together with solvents to form a one-component package with long shelf life. And the obtained adhesive composition may be applied to the surface of a device such as electronic device by commonly known coating methods and then be cured to provide an effective adhesion. Alternatively, the adhesive composition may be applied to the surface of a substrate such as a sheet, a film, a plate, a tape and then be dried to provide a B-stageable article, such as an adhesive tape. The B-stageable article can be stored at a normal environment in a package or in a rolling form and also has a long shelf life. Upon application, the B-stageable article may be applied to the devices and be further cured at a relatively high temperature and optional pressure to provide a completely cured article with heat resistance and flame retardance.

Therefore, the present disclosure also relates to a B-stageable article comprising a coating obtained from the adhesive composition after being actively cured. Preferably the B-stageable article is an adhesive tape, and in particular a B-stageable insulation tape. Also the present disclosure relates to an article which is a B-stageable insulation tape with a substrate such as a PET film, PI film, PEN film, Paper, fabric, nonwoven, polyaramid film or metal foil.

In a further aspect, the article has the following structures: the coating obtained from the adhesive composition of the present disclosure being disposed on a liner; the coating obtained from the adhesive composition of the present disclosure being disposed between a liner and a backing; a first coating obtained from the adhesive composition of the present disclosure being disposed on a liner, and then a backing and a second coating obtained from the adhesive composition of the present disclosure being disposed in sequence; and a backing being interposed between a first coating and a second coating.

The present disclosure further relates to a method for producing a B-stageable article, which comprises mixing the components of the composition of the present disclosure; and coating the obtained mixture onto a substrate, followed by drying the coated substrate. In an aspect, the substrate is a PET film. The coated substrate is dried at a temperature of 120° C. or less for a period of time allowing to from a B-stageable article, such as several minutes to several hours.

According to certain embodiments, the coating can be applied onto the surface of the substrate under a condition of under 25° C.

The present disclosure further relates to use of the adhesive composition or the article according to the present disclosure in insulation application for electrical devices which comprise battery, collector, PCB, bus bar and transformer and so on.

EXAMPLES

Hereinafter, the present disclosure is further described with reference to the following examples and comparative examples, which are provided in the present disclosure for illustrative purpose and are not for limiting the scopes of the present disclosure.

Raw Materials

The Raw materials used in the following illustrative examples of the present disclosure were commercial available and were listed in the following Table 1 by the trade name, chemical name and the vendor.

Peel Strength Test

The adhesion strength of the coating was evaluated by a "peeling strength test" at 25° C. and 105° C., the shelf life of the coating was evaluated by an accelerating test, the heat resistance of the coating was evaluated by adhesive oozing in "adhesive flow test", and the flame retardance of the coating was evaluated by a "flame retardant test".

Peeling strength test was conducted to evaluate the adhesion strength of the coating obtained from the adhesive composition. The test method of peel strength referred to "IPC-TM-650, No. 2.4.9", which was a commonly used test method in the art. The test samples were made by hot lamination (160° C., 0.7 MPa, 30 min). In the above peel strength test, 90 degree peel in 50 mm/min was employed to the test samples. The peel strength test at 25° C. evaluated the adhesion strength of the coating at 25° C. according to the following standards was shown in Table 2-1

TABLE 2-1

| Peel strength at 25° C. (N/mm) | Adhesion strength of the coating |
|---|---|
| 0.60-0.80 | Acceptable |
| 0.80-1.00 | Good |
| >1.00 | Excellent |

The peel strength at 105° C. evaluated the adhesion strength of the coating at 105° C. according to the following standards was shown in Table 2-2.

TABLE 2-2

| Peel strength at 105° C. (N/mm) | Adhesion strength of the coating |
|---|---|
| 0.10-0.15 | Acceptable |
| 0.15-0.20 | Good |
| >0.20 | Excellent |

Shelf Life Test

Aging test was conducted to evaluate the shelf life of the coating obtained from the adhesive composition provided in the present disclosure.

TABLE 1

Raw materials

| Component | Trade name | Chemical name | Vendor name |
|---|---|---|---|
| First epoxy resin | 40AX | Bisphenol A epoxy resin, epoxide equivalent wt >5000 g/eq, Mw of about 10000 g/mol, with a solid content of 40% | Shanddong Shengquan Co., Ltd. China |
| Second epoxy resin | ERS133 | PU modified Epoxy resin, epoxide equivalent wt 184~190 g/eq, Mw of about 400 g/mol, with a solid content of 100% | Shanghai ZhongSi Industury Co., Ltd. China |
| Second epoxy resin | DER671 | Bisphenol A epoxy resin, epoxide equivalent wt 491 g/eq, Mw of about 800 g/mol, with a solid content of 100% | DOW Chemical (China) Investment Co., Ltd |
| First curing agent | Dicy | Dicyandiamide | Ningxia Darong Chemical Co., Ltd. China |
| Second curing agent | 2599 | Isocyanate | Bayer MaterialScience LLC |
| Hydroxyl terminated polyester | 3300 | Polyester | Bostik (Shanghai) Management Co., Ltd. |
| 1$^{st}$ flame retardant | TPP | Triphenyl Phosphates | Jiangsu Changhe Chemical Co., Ltd., China |
| 2$^{nd}$ flame retardant | ATH | Aluminum hydroxide | MARTINSWERK GmbH |
| Substrate | | Polyethylene terephthalate film | Thickness: 125 um | Dupont Hongji Films Foshan Co., Ltd. |

The aging test comprised below steps.

1) Aging the coating according to the present disclosure in 80° C. oven.

2) Measure the peel strength of coating daily according to "IPC-TM-650, No. 2.4.9"

3) When the value is lower than 50% of fresh sample, record the number of aging day.

In the above aging test, a shelf life of the coating was measured according to the following standards showed in Table 2-3.

TABLE 2-3

| Aging days | Shelf life of the coating |
|---|---|
| 5-10 | Acceptable |
| 10-15 | Good |
| >15 | Excellent |

Heat Resistance Test

Adhesive flow test was conducted to evaluate the heat resistance of the coating obtained from the adhesive composition. The test method of flow property referred to "IPC-TM-650, No. 2.3.17.1", which was a common test method in the art for evaluating the flow property.

In the above adhesive flow test, the width of the adhesive which flows out after hot lamination (170° C., 0.7 MPa, 30 min) which was indicated as Oozing value was measured according to the following standards showed in Table 2-4.

TABLE 2-4

| Oozing value | Heat resistance |
|---|---|
| <0.2 mm | Good |

Dielectric Strength Test

Dielectric strength test was conducted to evaluate the insulation capability of the coating obtained from the adhesive composition and the film. The test method of dielectric strength referred to "ASTM D149", which was a common test method in the art for evaluating the dielectric strength.

In the above dielectric strength test, dielectric breakdown voltage was measured according to the following standards showed in Table 2-5.

TABLE 2-5

| Dielectric breakdown voltage | Dielectric strength |
|---|---|
| >12 KV | Pass |

Flame Retardant Test

The test method of flame retardant referred to "UL 94", which was a common test method in the art. In the above flame retardant test, the coating should pass a level of UL VTM0.

Example E1-E8

In all of the examples, the raw materials were weighed in the basis of solid weight.

Coating was prepared by the following steps using the components and amounts of the adhesive composition listed in Table 3:

Step 1: The first curing agent was added and dissolved in the first solvent (dimethylforamide) to obtain a first solution;

Step 2: The flame retardants were optionally added and dissolved in the second solvent (methyl ethyl ketone) to obtain a second solution; and Step 3: The first solution and the second solution (if have) was mixed with the first epoxy resin, the second epoxy resin, the second curing agent, the curing catalyst and the hydroxyl terminated polyester, stirred under the room temperature (25° C.) to obtain an coating.

Adhesive tape was prepared by the following steps using the components and amounts listed in Table 3:

Step 1: The coating was applied onto the surface of the PET film by blade-coating;

Step 2: The coated PET film was dried in an oven for ten minutes at a temperature 110° C. After being dried, the coating has a thickness of about 30 μm;

Step 3: The tape was optionally applied with a releasable film on the surface;

The adhesion strength, flame retardance, shelf life and heat resistance of the coating were measured according to the test methods as described above respectively. The test result were showed in Table 5.

Comparative Example C1-C10

In all of the comparative examples, the raw materials were weighed in the basis of solid weight.

The adhesive in the comparative examples C1 to C10 was prepared by the same method as above using the components and amounts as listed in Table 4. The test results were showed in Table 6.

TABLE 3

|    | 1st epoxy resin 40AX | 2nd epoxy resin ERS133 | 2nd epoxy resin DER671 | 1st curing agent Dicy | 2nd curing agent 2599 | Hydroxyl terminated polyester 3300 | 1st flame retardant TPP | 2nd flame retardant ATH |
|----|------|------|------|------|------|------|------|------|
| E1 | 10.0 | 20.0 | /    | 0.1  | 2.0  | 67.9 | 11.0 | 22.0 |
| E2 | 50.0 | 5.0  | /    | 1.5  | 0.5  | 43.0 | 11.0 | 22.0 |
| E3 | 12.4 | 5.0  | /    | 0.1  | 2.5  | 80.0 | 11.0 | 22.0 |
| E4 | 47.4 | /    | 20   | 2.5  | 0.1  | 30.0 | 11.0 | 22.0 |
| E5 | 25.0 | 8.0  | /    | 0.8  | 1.8  | 64.4 | 11.0 | 22.0 |
| E6 | 35.0 | 9.0  | /    | 0.8  | 1.2  | 54.0 | 11.0 | 22.0 |
| E7 | 25.0 | /    | 14.1 | 0.1  | 0.8  | 60.0 | 11.0 | 22.0 |
| E8 | 32.6 | /    | 16.0 | 1.2  | 0.2  | 50.0 | 11.0 | 22.0 |

TABLE 4

| | 1st epoxy resin 40AX | 2nd epoxy resin ERS133 | 2nd epoxy resin DER671 | 1st curing agent Dicy | 2nd curing agent 2599 | Hydroxyl terminated polyester 3300 | 1st flame retardant TPP | 2nd flame retardant ATH |
|---|---|---|---|---|---|---|---|---|
| C1 | 55.0 | / | 12.5 | 1.0 | 0.5 | 31.0 | 11.0 | 22.0 |
| C2 | 6.0 | 18.0 | / | 1.2 | 0.8 | 74.0 | 11.0 | 22.0 |
| C3 | 35.0 | 30.0 | / | 1.8 | 0.6 | 32.6 | 11.0 | 22.0 |
| C4 | 49.0 | / | 2.0 | 2.2 | 0.2 | 46.6 | 11.0 | 22.0 |
| C5 | 48.0 | 18.0 | / | 3.0 | 0.5 | 30.5 | 11.0 | 22.0 |
| C6 | 22.0 | 9.1 | / | 0 | 0.9 | 68.0 | 11.0 | 22.0 |
| C7 | 12.0 | 7.0 | / | 0.2 | 3.0 | 77.8 | 11.0 | 22.0 |
| C8 | 29.0 | / | 15.0 | 1.0 | 0 | 55.0 | 11.0 | 22.0 |
| C9 | 10.0 | 5.0 | / | 0.8 | 0.2 | 84.0 | 11.0 | 22.0 |
| C10 | 49.0 | 19.0 | / | 1.2 | 1.8 | 29.0 | 11.0 | 22.0 |

TABLE 5

| | Peel strength at 25° C. (N/mm) | Peel strength at 105° C. (N/mm) | Shelf life | Heat resistance | Dielectric strength | Flame retardancy |
|---|---|---|---|---|---|---|
| E1 | 1.61 | 0.15 | 11 | Good | Pass | Pass |
| E2 | 0.76 | 0.31 | 8 | Good | Pass | Pass |
| E3 | 1.75 | 0.12 | 12 | Good | Pass | Pass |
| E4 | 0.71 | 0.37 | 6 | Good | Pass | Pass |
| E5 | 1.68 | 0.19 | >15 | Good | Pass | Pass |
| E6 | 1.18 | 0.31 | >15 | Good | Pass | Pass |
| E7 | 1.76 | 0.32 | >15 | Good | Pass | Pass |
| E8 | 1.23 | 0.39 | >15 | Good | Pass | Pass |

TABLE 6

| | Peel strength at 25° C. (N/mm) | Peel strength at 105° C. (N/mm) | Shelf life | Heat resistance | Flame retardancy |
|---|---|---|---|---|---|
| C1 | 0.51 | 0.21 | 7 | Good | Pass |
| C2 | 1.55 | 0.06 | 12 | Good | Pass |
| C3 | 0.51 | 0.25 | 6 | Good | Pass |
| C4 | 0.58 | 0.15 | 9 | Good | Pass |
| C5 | 0.42 | 0.18 | 3 | Good | Pass |
| C6 | 1.52 | 0.07 | >15 | Fail | Pass |
| C7 | 1.66 | 0.05 | >15 | Good | Pass |
| C8 | 0.46 | 0.13 | 9 | Fail | Pass |
| C9 | 1.58 | 0.06 | 12 | Fail | Pass |
| C10 | 0.43 | 0.28 | 6 | Good | Pass |

From the experimental data of Table 5, all of adhesive obtained from the recipe of Table 3 (Examples E1 to E8) exhibited a good balance of adhesion strength, shelf life, heat resistance and flame retardance. The amount of first epoxy resin may vary from 10% by weight to 50% by weight of the adhesive and the second epoxy resin may be used in an amount of about 5% to 20% by weight of the adhesive. In order to achieve a better balance of these properties, it appears the ratio of first epoxy resin to second epoxy resin may be set between 4:1 and 2:1 (see Examples E6 to E8). The curing agent combination of Dicy and 2599 were demonstrated as an effective curing agent system. Furthermore, the hydroxyl terminated polyester was an effective toughener and may be present in an amount of up to 80% by weight, without deteriorate the adhesion strength and heat resistance of the adhesive.

As shown in the comparative examples C1 and C2, the adhesion strength was poor in the case that the first epoxy resin with a high Mw was used in an excess amount or insufficient amount, respectively.

Also as shown in the comparative examples C3 and C4, the amount of second epoxy resin will have en effect on the adhesion strength of the obtained adhesive.

The experimental data of comparative examples C5 to C8 demonstrated that the curing agent system was essential to the present invention. It appears the amount of anyone of the curing agent should not be too excess.

The experimental data of comparative examples C9 and C10 demonstrated that the amount of hydroxyl terminated polyester should be controlled.

To sum up, the coating according to the present disclosure have required adhesion strength, toughness, shelf life and aging performance, and functional properties such as heat resistance and flame retardance.

Although the present disclosure have been described with reference to a number of illustrative examples as explained above, it should be understood that numerous other modifications and examples can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An adhesive composition, based on the total weight of the composition, comprising the following components in solid content percentage:
   (A) 10% to 50% by weight of a first epoxy resin with a weight average molecular weight Mw of 8,000 g/mol or more;
   (B) 5% to 20% by weight of a second epoxy resin with a weight average molecular weight Mw of 200 to 6,000 g/mol and a glass transition temperature Tg of 150° C. or less;
   (C) 30% to 80% by weight of a hydroxyl terminated polyester or derivates thereof;
   (D) 0.1% to 2.5% by weight of a first curing agent capable of reacting with epoxy group; and
   (E) 0.1% to 2.5% by weight of a second curing agent capable of reacting with hydroxyl group;
   the sum of components of the composition is equal to 100% by weight.

2. The adhesive composition according to claim 1, wherein the first epoxy resin is selected from the group consisting of bisphenol A epoxy resins, brominated bisphenol A epoxy resins, bisphenol F epoxy resins, bisphenol AD epoxy resins, novolac epoxy resin, trisphenolmethane epoxy resin, glycidylamine epoxy resin, aminophenol epoxy resin, naphthalene epoxy resin, epoxy resins containing a fluorene ring, cycloaliphatic glycidyl ether-epoxy resins, cycloaliphatic glycidylamine epoxy resins, cycloaliphatic glycidyl ester-epoxy resins, and the combination thereof.

3. The adhesive composition according to claim 1, wherein the first epoxy resin is present in the composition in an amount of 25% to 40% by weight, based on the total weight of the composition in a solid content percentage.

4. The adhesive composition according to claim 1, wherein the second epoxy resin has an epoxide equivalent weight of 100 to 3500 g/eq.

5. The adhesive composition according to claim 1, wherein the second epoxy resin is selected from the group consisting of polyurethane modified bisphenol A epoxy resin, polyurethane modified bisphenol F epoxy resin, polyurethane modified novolac epoxy resin, polyurethane modified trisphenolmethane epoxy resin, polyurethane modified glycidylamine epoxy resin, polyurethane modified aminophenol epoxy resin, polyurethane modified naphthalene epoxy resin and the combination thereof.

6. The adhesive composition according to claim 1, wherein the second epoxy resin is present in the composition in an amount of 8% to 20% by weight, based on the total weight of the composition in a solid content percentage.

7. The adhesive composition according to claim 1, wherein the hydroxyl terminated polyester has a weight average molecular weight Mw of 8,000 g/mol or more.

8. The adhesive composition according to claim 1, wherein the hydroxyl terminated polyester has a hydroxyl value of 3-100 mg KOH/g.

9. The adhesive composition according to claim 1, wherein the polyester comprises a dicarboxylic acid unit and a glycol unit, wherein the dicarboxylic acid unit comprises one or more of succinic acid, adipic acid, cyclohexane diacid, suberic acid, phthalic acid, naphthalene acid, trimellitic acid, and pyromellitic acid, and the glycol unit comprises one or more of ethylene glycol, propylene glycol, butanediol, pentanediol, hexanediol, octanediol, decanediol, diethylene glycol, dipropylene glycol, dimethylolpropane, and dimethylolethane.

10. The adhesive composition according to claim 1, wherein the hydroxyl terminated polyester is present in the composition in an amount of 40% to 70% by weight, based on the total weight of the composition in a solid content percentage.

11. The adhesive composition according to claim 1, wherein the first curing agent is selected from the group consisting of dicyandiamide, dihydrazide, amine-based curing agent, acid anhydride-based curing agent, imidazole compound, borofluoride, octoate salt, their encapsulate, and the combination thereof.

12. The adhesive composition according to claim 1, wherein the first curing agent is present in the composition in an amount of 0.2%-4.5% by weight, based on the total weight of the composition in a solid content percentage.

13. The adhesive composition according to claim 1, wherein the second curing agent is selected from the group consisting of carboxylic compound, amine based polymer, isocyanate, isocyanate prepolymer, diisocyanate and diisocyanate prepolymer, and the combination thereof.

14. The adhesive composition according to claim 13, wherein the second curing agent is selected from the group consisting of tolylene diisocyanate, diphenyl methane diisocyanate, hexamethylene diisocyanate, isophorone diisocyanate and their prepolymer, and the combination thereof.

15. The adhesive composition according to claim 1, wherein the second curing agent is present in the composition in an amount of 0.2%-1.5% by weight, based on the total weight of the composition in a solid content percentage.

16. The adhesive composition according to claim 1, wherein the weight ratio of the first epoxy resin to the second epoxy resin is in a range of 10:1 to 1:2, in a solid content basis.

17. The adhesive composition according to claim 1, wherein the weight ratio of the polyester to the sum of the first and second epoxy resin is in a range of 0.3:1 to 5:1, in a solid content basis.

18. The adhesive composition according to claim 1, wherein the adhesive composition is a B-stageable adhesive composition.

19. An article comprising a substrate and a coating obtained from an adhesive composition formed on a surface of the substrate, wherein the adhesive composition, based on the total weight of the composition, comprises the following components in solid content percentage:
  (A) 10% to 50% by weight of a first epoxy resin with a weight average molecular weight Mw of 8,000 g/mol or more;
  (B) 5% to 20% by weight of a second epoxy resin with a weight average molecular weight Mw of 200 to 6,000 g/mol and a glass transition temperature Tg of 150° C. or less;
  (C) 30% to 80% by weight of a hydroxyl terminated polyester or derivates thereof;
  (D) 0.1% to 2.5% by weight of a first curing agent capable of reacting with epoxy group; and
  (E) 0.1% to 2.5% by weight of a second curing agent capable of reacting with hydroxyl group;
  the sum of components of the composition is equal to 100% by weight.

* * * * *

UNITED STATES PATENT AND TRADEMARK OFFICE
CERTIFICATE OF CORRECTION

PATENT NO. : 10,626,308 B2
APPLICATION NO. : 15/752802
DATED : April 21, 2020
INVENTOR(S) : Yang et al.

Page 1 of 1

It is certified that error appears in the above-identified patent and that said Letters Patent is hereby corrected as shown below:

In the Claims

Column 16,
Line 3, delete "0.2%4.5%" and insert in place thereof -- 0.2%-1.5% --.

Signed and Sealed this
Twenty-seventh Day of October, 2020

Andrei Iancu
*Director of the United States Patent and Trademark Office*